US008416772B1

(12) United States Patent  
Pritchard

(10) Patent No.: US 8,416,772 B1  
(45) Date of Patent: Apr. 9, 2013

(54) DATA STORAGE SYSTEM HAVING OPTICAL/NON-OPTICAL COMMUNICATION LCC

(75) Inventor: Jason Pritchard, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 1050 days.

(21) Appl. No.: 11/768,319

(22) Filed: Jun. 26, 2007

(51) Int. Cl.
H04J 9/00 (2006.01)

(52) U.S. Cl.
USPC .......................................... 370/363; 370/297

(58) Field of Classification Search .................. 370/282, 370/284, 293, 297, 360–363, 381–383, 402, 370/466–467; 439/49; 710/106, 14, 20, 710/35, 65, 74; 385/100, 101, 139
See application file for complete search history.

(56) References Cited

U.S. PATENT DOCUMENTS

| 5,901,151 | A | * | 5/1999 | Bleiweiss et al. | 370/480 |
| 7,042,737 | B1 | * | 5/2006 | Woolsey et al. | 361/799 |
| 7,571,333 | B1 | * | 8/2009 | Felton | 713/310 |
| 7,778,244 | B1 | * | 8/2010 | Sheikh et al. | 370/363 |
| 7,783,802 | B1 | * | 8/2010 | Nemazie et al. | 710/74 |
| 7,804,793 | B1 | * | 9/2010 | Felton | 370/284 |

* cited by examiner

Primary Examiner — Michael Thier  
Assistant Examiner — Curtis A Alia  
(74) Attorney, Agent, or Firm — Krishnendu Gupta; Konrad R. Lee

(57) ABSTRACT

A link control card for disk drives. The link control card includes: a first connector for carrying relatively high frequency user data and low frequency signals; a diplexer connected to the connector, such diplexer having a first port for the high frequency user data and a second port for the low frequency signals; an optical connector for carrying the relatively high frequency user data; and a high frequency user data communication channel disposed between the diplexer and the disk drives for selectively connected either the first port of the diplexer or the optical connector to the disk drives.

7 Claims, 8 Drawing Sheets

US 8,416,772 B1

DATA STORAGE SYSTEM HAVING OPTICAL/NON-OPTICAL COMMUNICATION LCC

TECHNICAL FIELD

This invention relates generally to disk drive data storage systems and more particularly to disk drive data storage systems having a plurality of interconnected enclosures.

BACKGROUND

As is known in the art, many disk drive data storage systems have a plurality of interconnected enclosures. One such system, shown in FIG. 1, includes a plurality of disk drive enclosures coupled to a pair of redundant ports, port A and port B of a data storage processor through wire fibre channel cables, as shown. In general, each of the enclosures is identical in construction; an exemplary one thereof is shown in FIG. 2 to include dual ported disk drives. The disk drives are coupled to a link control card (LCC). The LCC has a pair of primary ports (PRIM) and a pair of expansion ports (EXP). The cabinets are interconnected in a daisy chain manner shown in FIG. 2 with, as noted above, wire fibre channel cables. Applications for the disk drives enclosures include, for example, JBOD (Just a Bunch Of Disks), RAID (Redundant Array of Independent Disks), and SAN (Storage Area Network).

The LCC includes a pair of diplexers coupled to the primary ports and expansion ports, as shown. Each one of the diplexers is here, for example, a diplexer such as that described in U.S. Pat. No. 5,901,151, entitled "System for orthogonal signal multiplexing", inventor Bleiweiss, et al., issued May 4, 1999, now assigned to the same assignee as the present inventions. The diplexers are coupled to a cut through switch sections, here for example, that manufactured by PMC-Sierra, Burnaby, B.C., Canada. Thus, the disk drives are interconnected by a high-speed serial data communication path such as a Fibre Channel arbitrated loop. Each LCC includes an environmental monitor. Control signals to the environmental monitor are low frequency signals compared to the frequency signals of the signals carrying user data on the fibre channel cables. Both the low frequency and high frequency signals pass through the fibre channel cables. Thus, the fibre channel cables carry both high data rate user data that passes to and from the disk drives and low frequency signals for the environmental monitor. FIG. 3 shows the LCC in more detail. It is noted that capacitors C hare placed between the diplexers and the cut through switch section to block the low frequency signals while allowing the high data rate user data to pass to and from the disk drives.

Referring again to FIG. 1, it is noted that currently, in many systems, the electrically conductive (e.g., copper) fibre channel cables of 5 meters length between enclosures is the maximum distance a signal can travel. While optical cables offer increased distance, the connectors at the ports of the LCC are not suited for fiber optic cables. Also, fiber optic cables do not support both the high frequency data rate signals and the low frequency signals for the LCC.

SUMMARY

In accordance with the present invention, a link control card is provided for disk drives. The link control card includes: a first connector for carrying relatively high frequency user data and low frequency signal; a diplexer connected to the connector, such diplexer having a first port for the high frequency user data and a second port for the low frequency signals; an optical connector for carrying the relatively high frequency user data; and a high frequency user data communication channel disposed between the diplexer and the disk drives for selectively connected either the first port of the diplexer or the optical connector to the disk drives.

In one embodiment, the high frequency user data communication channel includes: a first electrical wire having a first end connected to the first port of the diplexer and a second end terminating in a first electrically conductive terminal; a second electrical wire having a first end terminating in a second electrically conductive terminal spaced from the first electrically conductive terminal and a second end coupled to the disk drives; and a third electrical wire having a first end connected to the optical connector and a second end terminating in a third electrically conductive terminal.

In one embodiment, the link control card includes a capacitor connected across either: the first electrically conductive terminal and the second electrically conductive terminal; or the third electrically conductive terminal and the second electrically conductive terminal.

In one embodiment, link control card includes a switch having a common terminal electrically connected selectively to either first electrically conductive terminal or to the second electrically conductive terminal, such common terminal being electrically connected to the first electrically conductive terminal.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
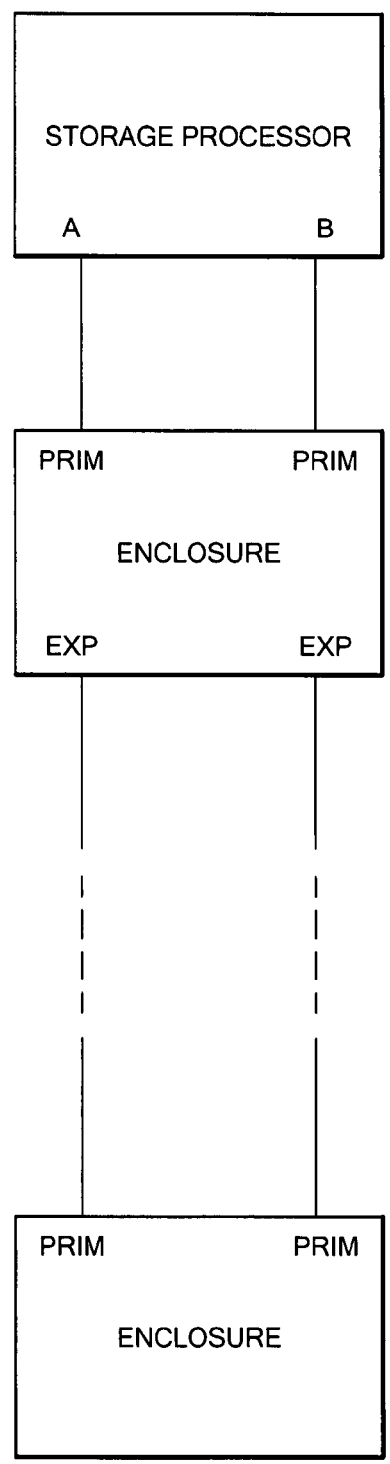
FIG. 1 is a diagram showing a plurality of interconnected encloses of a data storage system according to the PRIOR ART.
Figure 2:
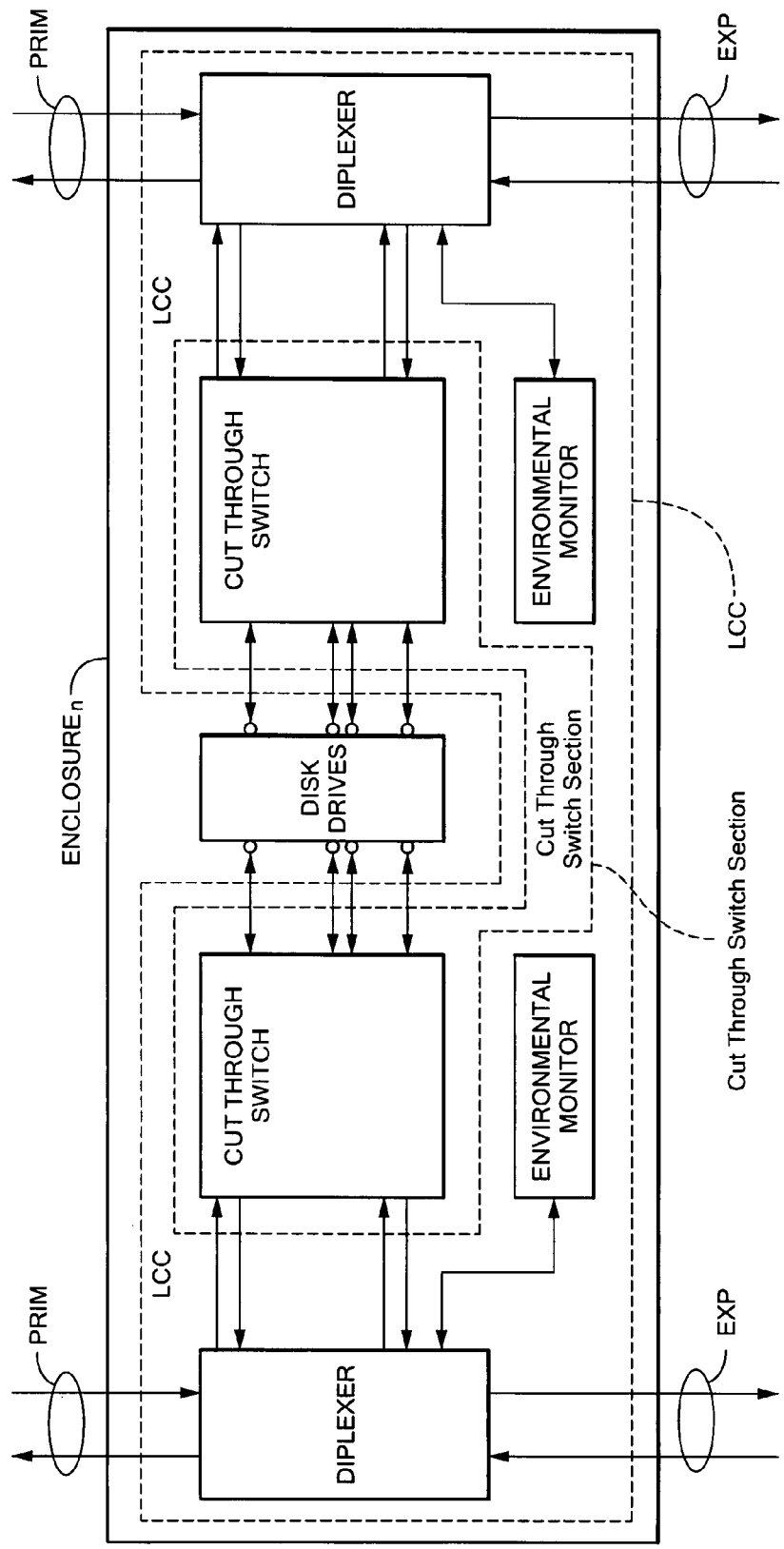
FIG. 2 is a schematic block diagram of an exemplary one of the enclosures of FIG. 1 according to the PRIOR ART.
Figure 3:
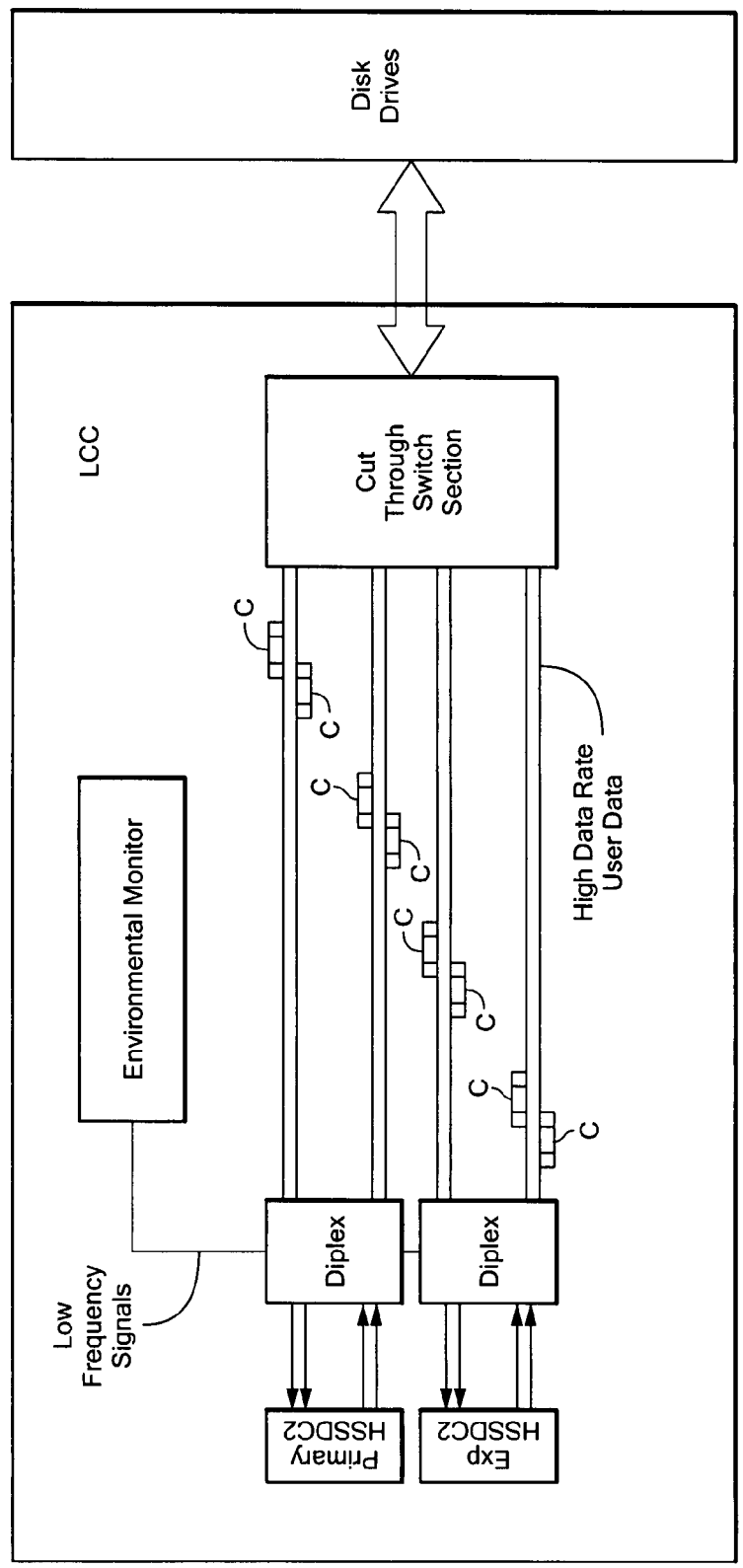
FIG. 3 is a schematics block diagram of a link control card (LCC) used in the enclosure of FIG. 2 according to the PRIOR ART.
Figure 4:
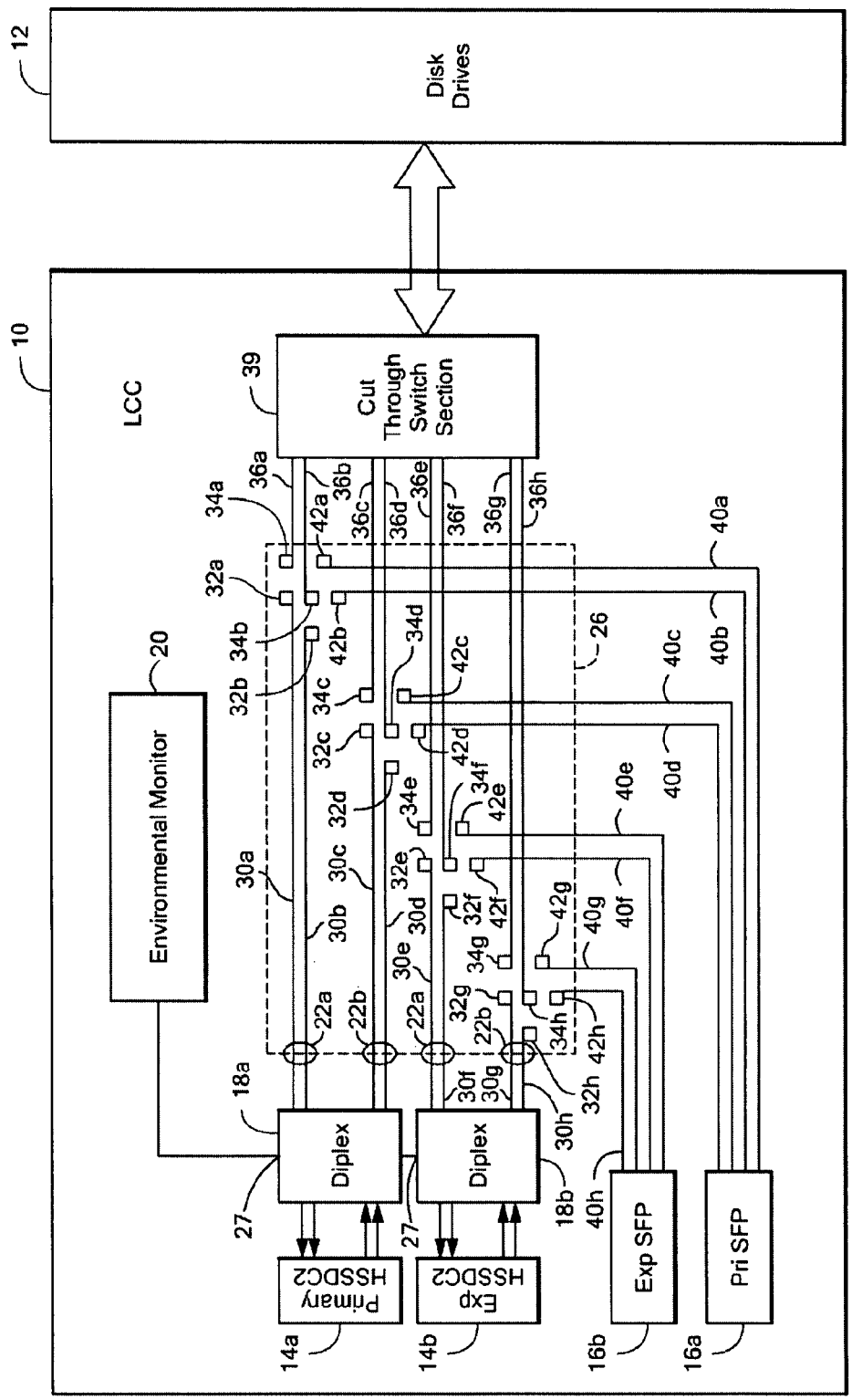
FIG. 4 is a schematics block diagram of a link control card (LCC) according to the invention prior to configuration of such LCC.

Referring now to FIG. 4, a link control card (LCC) 10 is shown for disk drives 12. The LCC 10 includes a pair of HSSDC2 connectors 14a, 14b, the former providing the primary port (PRIM) and the latter providing the expansion port (EXP) for the LCC 10. These HSSDC2 connectors 14a, 14b are adapted for connecting to electrically conductive wires or cables for example fibre channel conductive cables. The LCC 10 also includes a pair of SFP connectors 16a, 16b, the former providing the primary port (PRIM) and the latter providing the expansion port (EXP) for the LCC 10. These SFP connectors 16a, 16b are adapted for connecting to fiber optic cables. It is noted that while the HSSDC2 connectors 14a, 14b are adapted to carry both high frequency user data to and from the disk drives and low frequency signals to a environmental monitor 20, the SFP connectors are adapted to carry to and from the fiber optic cables connected thereto only the high frequency user data to and from the disk drives 12.

The LCC 10 also includes a pair of diplexers 18a, 18b. Each one of the diplexers is here, for example, a diplexer such as that described in U.S. Pat. No. 5,901,151, entitled "System for orthogonal signal multiplexing", inventor Bleiweiss, et al., issued May 4, 1999, now assigned to the same assignee as the present inventions. The diplexers 18a, 18b are connected to the pair of HSSDC2 connectors 14a, 14b, respectively, as shown.

More particularly, each one of the diplexers has first ports 22a, 22b for the high frequency user data and a second port 27 for the low frequency signal passing to and from the environmental monitor 20.

The LCC 10 includes a high frequency user data communication channel 26 disposed between the first high frequency ports 22a, 22b of the diplexers 18a, 18b, optical connectors 16a, 16b, and the disk drives 12 for selectively connected to the disk drives 12 either: one or both of the first ports 22a, 22b of the diplexers 18a, 18b; or one or both of the optical connectors 16a, 16b.

The high frequency user data communication channel 26 includes a plurality of, here 8, conductor sections (e.g., wires) 30a-30h having first ends connected to the first ports 22a, 22b of the diplexers 18a, 18b, as shown, and second ends connected to contact pads 32a-32h, respectively. The high frequency user data communication channel 26 includes contact pads 34a-34, horizontally spaced from and proximate to, the contact pads 32a-32h, respectively, as shown. The high frequency user data communication channel 26 includes conductor sections (e.g., wires) 36a-36h having first ends connected to the contact pads 34a-34h, respectively, as shown, and second ends connected to a cut through switch section 39, as shown. The high frequency user data communication channel 26 includes a plurality of, here 8, conductor section 40a-40h having first ends connected to the SFP connectors 16a, 16b, as shown, and second ends connected to contact pads 42a-42h, respectively. It is noted that contacts pads 42a-42h are vertically spaced from and proximate to, the contact pads 36a-36h, respectively.

Figure 5:
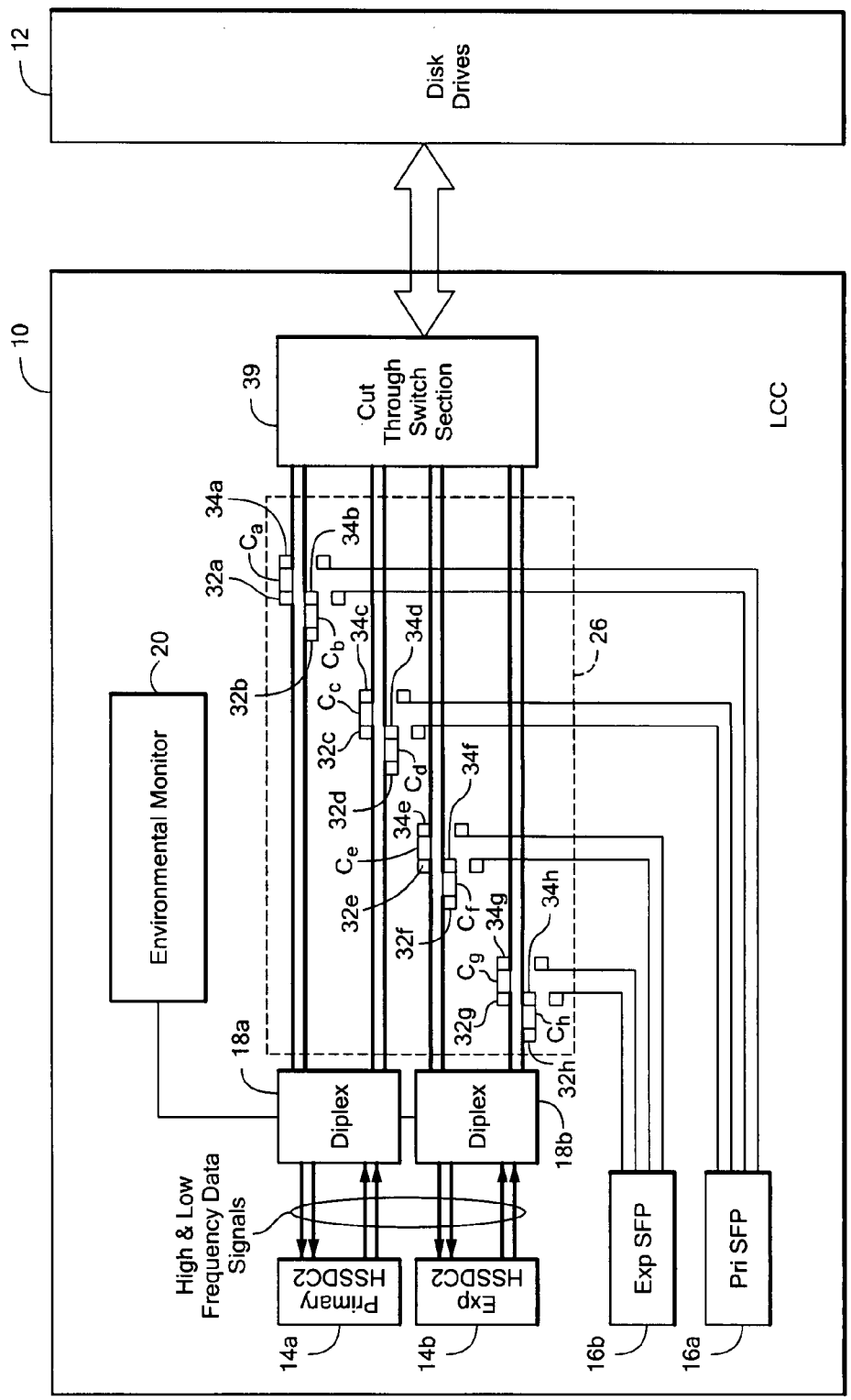
FIG. 5 is a schematics block diagram of a link control card (LCC) of FIG. 4 after a first exemplary configuration of such LCC according to the invention.

For example, referring to FIG. 5, here, in this embodiment, the LCC 10 receives both high frequency user data signals for the disk drives and low frequency signals for the environmental monitor 20 at HSSDC2 connectors 14a, 14b. To couple the high frequency user data signals to the disk drives 12 capacitors $C_a$-$C_h$ are connected to pairs of contacts pads 32a, 34a-32h, 34h, respectively, as shown. It is noted that the contact pads 34a, 42a-32h, 42h, remain unconnected from each other (i.e., in the condition shown in FIG. 4). Thus, in this configuration, the high frequency user data communication channel 26 selectively connects to the disk drives 12 through the cut through section 39 only both of the first ports 22a, 22b of the diplexers 18a, 18b with the both of the optical connectors 16a, 16b being disconnected from the disk drives 12.

Figure 6:
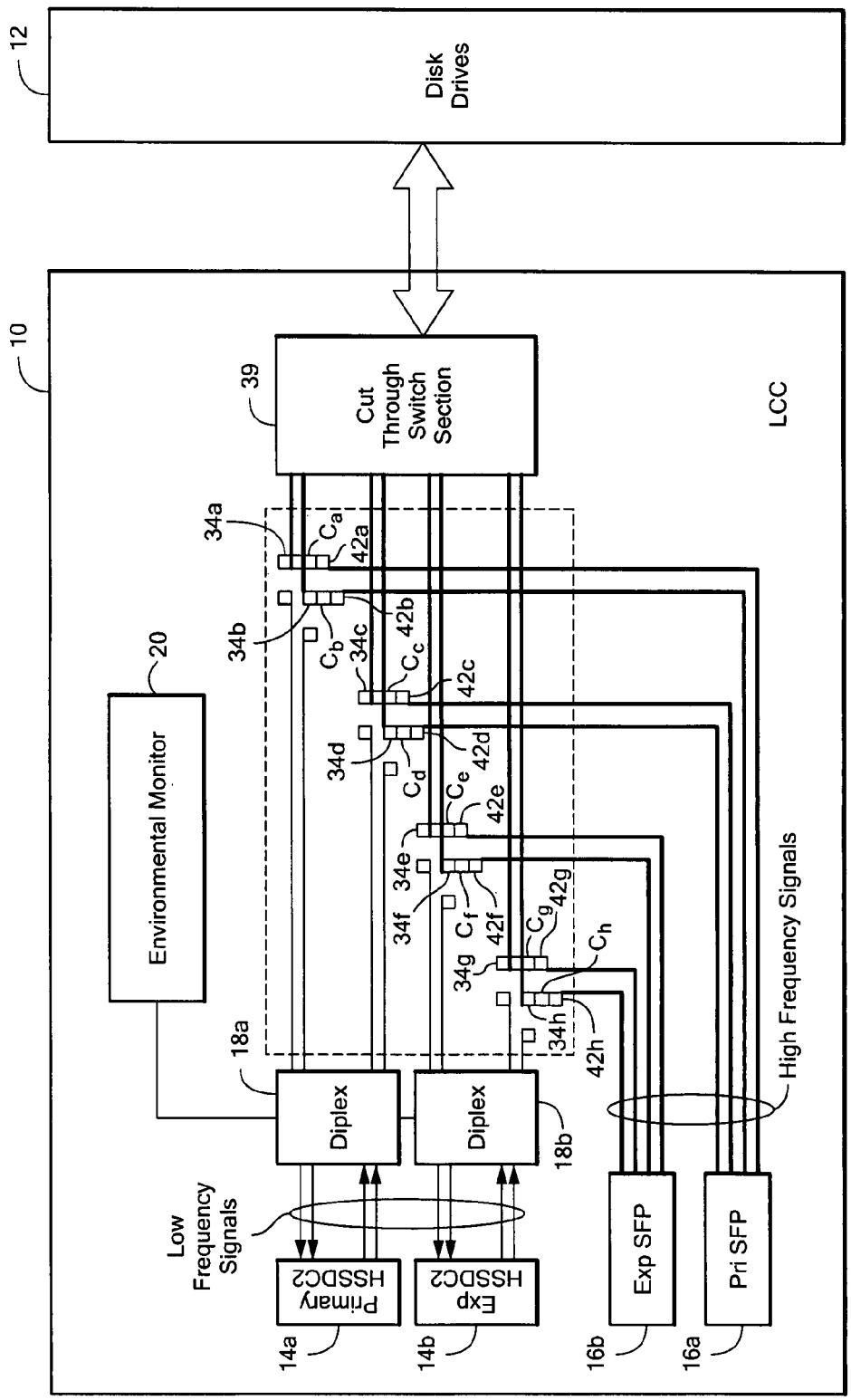
FIG. 6 is a schematics block diagram of a link control card (LCC) of FIG. 4 after a second exemplary configuration of such LCC according to the invention.

In another example, referring to FIG. 6, here, in this embodiment, the LCC 10 receives low frequency signals for the environmental monitor 20 at the HSSDC2 connectors 14a, 14b and receives the high frequency user data signals for the disk drives 12 at SFP connectors 16a, 16b. To couple the high frequency user data signals to the disk drives 12 capacitors $C_a$-$C_h$ are connected to pairs of contacts pads 34a, 42a-34h, 42h, respectively, as shown. It is noted that the contact pads 32a, 34a-32h, 34h, remain unconnected from each other (i.e., in the condition shown in FIG. 4). Thus, in this configuration, the high frequency user data communication channel 26 selectively connects to the disk drives 12 through the cut through section 39 only both of the optical connectors 16a, 16b with the diplexers 18a, 18b being disconnected from the disk drives 12.

Figure 7:
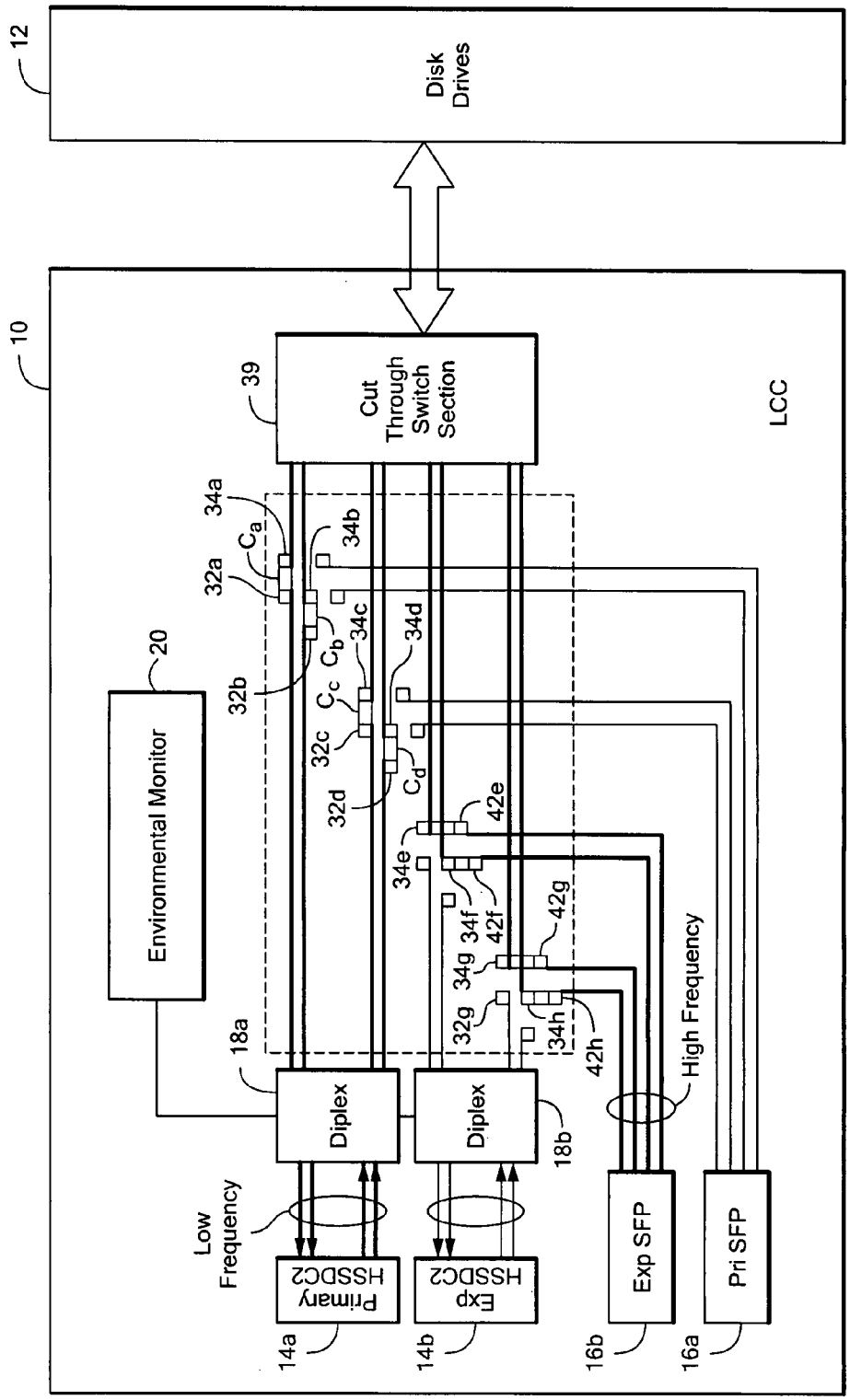
FIG. 7 is a schematics block diagram of a link control card (LCC) of FIG. 4 after a third exemplary one of such LCC according to the invention.

In another example, referring to FIG. 7, here, in this embodiment, the LCC 10 receives low frequency signals and high frequency user data signals at the HSSDC2 connectors 14a (i.e., a primary port) as for connections within a single enclosure, and receives the receives low frequency signals and high frequency user data signals at high frequency user data signals for the disk drives 12 at SFP connector 16b (i.e., an expansion port as for connections between enclosures). To coupled the high frequency user data signals to the disk drives 12 capacitors $C_a$-$C_d$ are connected to pairs of contacts pads 32a, 34a-32d, 34d, respectively, as shown, capacitors $C_e$-$C_h$ are connected to pairs of contacts pads 34e, 34h-42e, 42h, respectively, as shown. Thus, in this configuration, the high frequency user data communication channel 26 selectively connects to the disk drives 12 through the cut through section 39 only both of the optical connector 16b and diplexers 18a, the optical connector 16a and diplexers 18b being disconnected from the disk drives 12.

Figure 8A:
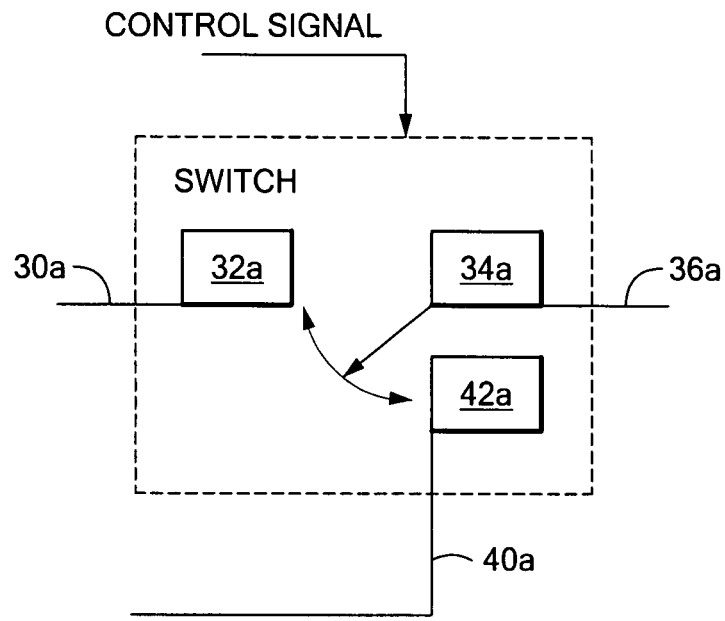
FIG. 8A shows a portion of a high frequency user data transmission of the LCC of FIG. 4 according to one embodiment of the invention and FIG. 8B shows a portion of a high frequency user data transmission of the LCC of FIG. 4 according to another embodiment of the invention.

Referring now to FIG. 8A, a portion of the high frequency user data communication channel 26 is shown with exemplary adjacent ones of the contact pads, here contact pads 32a, 34a, and 42a selectively interconnected through an electronically controlled switch instead of using selectively placed capacitors.

Figure 8B:
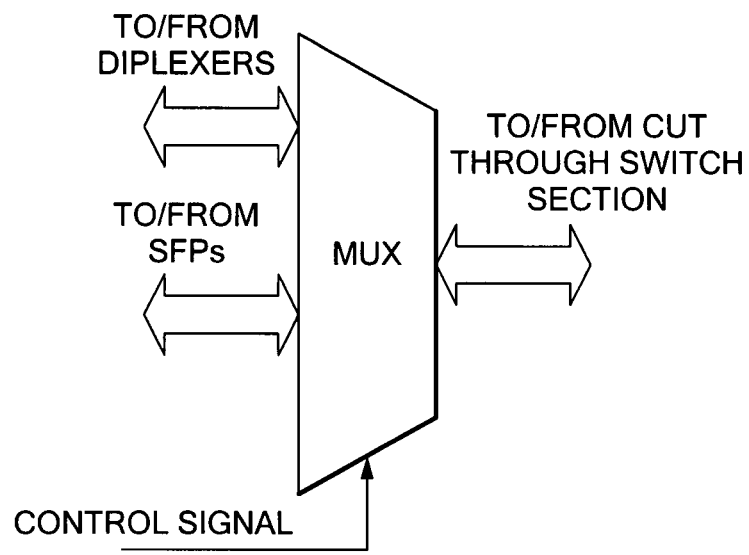

Referring now to FIG. 8B, the high frequency user data communication channel 26 is shown using a multiplexer type electric switch to selectively interconnected to the cut through switch section either one or both of the diplexers and/.or one or both of the SFPs instead of using selectively placed capacitors.

A number of embodiments of the invention have been described. Nevertheless, it will be understood that various modifications may be made without departing from the spirit and scope of the invention. For example, the switch may be a multiplexer. Accordingly, other embodiments are within the scope of the following claims.

What is claimed is:
1. A link control card for disk drives, comprising:
a first connector for carrying user data and environmental data;
a diplexer having:
an environmental data port for carrying the-environmental data through the diplexer; and
a user data port for carrying user data to and from the user data connector through the diplexer;
an optical connector for carrying user data;
a communication channel for coupling user data to and from the disk drives through a selected one of two paths, a first path of the two paths being between the disk drives and the user data port of the diplexer and a second path of the two paths being between the disk drives and the optical connector wherein the communication channel includes:
a first electrical wire having a first end connected to the port of the diplexer and a second end terminating in a first electrically conductive terminal;
a second electrical wire having a first end terminating in a second electrically conductive terminal spaced from the first electrically conductive terminal and a second end coupled to the disk drives;
a third electrical wire having a first end connected to the optical connector and a second end terminating in a third electrically conductive terminal; and
a switch for selecting one of the two paths;
wherein the switch selects the first path of the two paths by coupling the first electrically conductive terminal and the second electrically conductive terminal;
wherein the switch selects the second path of the two paths by coupling the third electrically conductive terminal and the second electrically conductive terminal.

2. The link control card recited in claim 1, including a capacitor selectively connected across the first electrically conductive terminal and the second electrically conductive terminal to provide the path between the disk drives and the user data port of the diplexer during one configuration of the communication channel; or
the third electrically conductive terminal and the second electrically conductive terminal to provide the path between the disk drives and the optical connector during a different configuration of the communication channel.

3. A link control card for disk drives, comprising:
a diplexer having:
    a first port for carrying user data to and from a first connector;
    a second port for carrying environmental data and a third port;
an optical connector for carrying user data to and from a second connector; and
a user data communication channel coupled to: the third port of the diplexer;
the optical connector; and
the disk drives, the user data communication channel connecting the disk drives to either:
    the third port of the diplexer; or
    the optical connector;
wherein the data communication channel includes:
    a first electrical wire having a first end connected to the third port of the diplexer and a second end terminating in a first electrically conductive terminal of the user data communication channel;
    a second electrical wire having a first end terminating in a second electrically conductive terminal of the user data communication channel spaced from the first electrically conductive terminal and a second end coupled to the disk drives; and
    a third electrical wire having a first end connected to the optical connector and a second end terminating in a third electrically conductive terminal of the user data communication channel; and
a switch for selecting one of two paths of the user data communication channel;
wherein the switch selects the first path of the two paths by coupling the first electrically conductive terminal and the second electrically conductive terminal;
wherein the switch selects the second path of the two paths by coupling the third electrically conductive terminal and the second electrically conductive terminal.

4. The link control card recited in claim 3, including a capacitor connected across either:
the first electrically conductive terminal and the second electrically conductive terminal to provide a path between the first electrically conductive terminal and the second electrically conductive terminal during one configuration of the communication channel; or
the third electrically conductive terminal and the second electrically conductive terminal to provide a path between the third electrically conductive terminal and the second electrically conductive terminal during a different configuration of the communication channel.

5. A link control card for disk drives, comprising:
a first connector for carrying first data and second data, the first data having a frequency lower than a frequency of the second data;
a diplexer, comprising:
    a first port connected to the first connector;
    a second port for carrying the first data to the first connector through diplexer; and
    a third port for carrying the second data to and from the first connector through the diplexer;
a second connector for carrying third data, the third data having a frequency higher than the frequency of the first data;
a communication channel for selectively coupling the second data or the third data to and from the disk drives, the second data passing between the disk drives and the third port of the diplexer and the third data passing being between the disk drives and the second connector;
wherein the communication channel includes:
    a first electrical wire having a first end connected to the third port of the diplexer and a second end terminating in a first electrically conductive terminal;
    a second electrical wire having a first end terminating in a second electrically conductive terminal spaced from the first electrically conductive terminal and a second end coupled to the disk drives; and
    a third electrical wire having a first end connected to the second connector and a second end terminating in a third electrically conductive terminal; and
a switch for selecting one of two paths of the communication channel;
wherein the switch selects the first path of the two paths by coupling the first electrically conductive terminal and the second electrically conductive terminal;
wherein the switch selects the second path of the two paths by coupling the third electrically conductive terminal and the second electrically conductive terminal.

6. The link control card recited in claim 5, including a capacitor connected across either:
the first electrically conductive terminal and the second electrically conductive terminal during one configuration of the communication channel; or
the third electrically conductive terminal and the second electrically conductive terminal during a different configuration of the communication channel.

7. The link control card recited in claim 6, wherein the first connector is an electrical connector and the second connector is an optical connector.

* * * * *